US012012791B2

(12) United States Patent
Knoth et al.

(10) Patent No.: US 12,012,791 B2
(45) Date of Patent: Jun. 18, 2024

(54) FITTING ARRANGEMENT FOR A LEAF THAT CAN BE MOVED AWAY IN PARALLEL AND CLOSURE ARRANGEMENT FOR A BUILDING OPENING

(71) Applicant: Roto Frank Fenster- und Türtechnologie GmbH, Leinfelden-Echterdingen (DE)

(72) Inventors: Dominik Knoth, Aichtal (DE); Aleksander Vukovic, Filderstadt (DE); Gerhard Gross, Ostfildern (DE); Stefan Fingerle, Reutlingen-Rommelsbach (DE); Richard Erb, Waldenbuch (DE); Kevin Bienert, Wendlingen (DE)

(73) Assignee: Roto Frank Fenster- und Türtechnologie GmbH, Leinfelden-Echterdingen (DE)

( * ) Notice: Subject to any disclaimer, the term of this patent is extended or adjusted under 35 U.S.C. 154(b) by 211 days.

(21) Appl. No.: 17/649,244

(22) Filed: Jan. 28, 2022

(65) Prior Publication Data

US 2022/0154507 A1 May 19, 2022

Related U.S. Application Data

(63) Continuation of application No. PCT/EP2020/071159, filed on Jul. 27, 2020.

(30) Foreign Application Priority Data

Jul. 31, 2019 (DE) ..................... 10 2019 211 424.5
Oct. 28, 2019 (DE) ..................... 10 2019 216 524.9

(51) Int. Cl.
*E05D 15/10* (2006.01)
*E05F 1/16* (2006.01)
(Continued)

(52) U.S. Cl.
CPC ................ *E05D 15/10* (2013.01); *E05F 1/16* (2013.01); *E05F 5/003* (2013.01); *E06B 3/50* (2013.01);
(Continued)

(58) Field of Classification Search
CPC ....... E05F 1/16; E05F 1/08; E05F 1/14; E05F 1/1292; E05F 5/003; E05F 3/00; E05F 3/50; E05D 15/10
See application file for complete search history.

(56) References Cited

U.S. PATENT DOCUMENTS 7,647,728 B2 1/2010 Bortoluzzi
7,971,392 B2 7/2011 Seo
(Continued)

FOREIGN PATENT DOCUMENTS

CN 1802486 A 7/2006
CN 101068997 A 11/2007
(Continued)

*Primary Examiner* — Justin B Rephann
(74) *Attorney, Agent, or Firm* — Orbit IP

(57) ABSTRACT

A fitting arrangement for a leaf of a sliding window or door that can be moved away in parallel, includes a control unit having a mounting part for fixing on the leaf and an adjusting part which is displaceable relative to the mounting part for moving the leaf away in parallel. A movement unit is fastened to the control unit and has an energy storage device and an activation element for the energy storage device. A closure arrangement for a building opening, includes a frame, the control unit and the adjusting part. The leaf which, in a closed position, can, by means of the control unit, be brought up to the frame and be moved away from the frame in parallel, so the leaf is displaceable along a guide rail of the frame. The movement unit supports an automatic movement of the leaf along the guide rail.

19 Claims, 12 Drawing Sheets

(51) Int. Cl.
*E05F 5/00* (2017.01)
*E06B 3/50* (2006.01)

(52) U.S. Cl.
CPC ....... *E05Y 2201/21* (2013.01); *E05Y 2201/64* (2013.01); *E05Y 2900/132* (2013.01); *E05Y 2900/148* (2013.01)

(56) References Cited

U.S. PATENT DOCUMENTS

| | | | | |
|---|---|---|---|---|
| 8,046,872 | B2 * | 11/2011 | Burgess, III | E05D 15/0639 16/104 |
| 8,393,114 | B2 | 3/2013 | Haab et al. | |
| 8,402,606 | B1 * | 3/2013 | Tsai | E05F 5/003 16/49 |
| 8,443,551 | B2 * | 5/2013 | Walhorn | E05F 1/16 49/404 |
| 9,009,918 | B2 * | 4/2015 | Haab | E05D 15/0634 16/72 |
| 9,765,559 | B2 * | 9/2017 | Shin | E05F 3/00 |
| 9,863,178 | B2 * | 1/2018 | Wang | E05F 5/027 |
| 9,885,206 | B2 * | 2/2018 | Shin | E05F 3/00 |
| 11,421,461 | B2 * | 8/2022 | Martin | E05F 3/227 |
| 11,585,140 | B2 * | 2/2023 | Terno | E05F 1/16 |
| 2013/0160240 | A1 * | 6/2013 | Kenny | E05F 1/16 16/89 |
| 2016/0333622 | A1 * | 11/2016 | Glogowski | E05F 3/18 |
| 2017/0198510 | A1 * | 7/2017 | Shin | E05F 5/003 |
| 2017/0198511 | A1 * | 7/2017 | Shin | E06B 3/4636 |
| 2017/0260793 | A1 * | 9/2017 | Muñoz Pelayo | E05F 5/003 |
| 2017/0265644 | A1 * | 9/2017 | Fischer | F16C 29/005 |
| 2017/0362881 | A1 * | 12/2017 | Gosling | E06B 3/4654 |
| 2018/0371815 | A1 * | 12/2018 | Intelmann | E05F 3/02 |
| 2019/0069672 | A1 * | 3/2019 | Pan | A47B 88/467 |
| 2019/0309551 | A1 * | 10/2019 | Hawkinson | E06B 7/2307 |
| 2019/0330904 | A1 * | 10/2019 | Svara | E05F 3/22 |
| 2019/0390496 | A1 * | 12/2019 | Bacchetti | E05F 3/10 |
| 2020/0190882 | A1 * | 6/2020 | Bantle | E05F 3/00 |

FOREIGN PATENT DOCUMENTS

| | | | |
|---|---|---|---|
| CN | 101644122 | A | 2/2010 |
| CN | 202 831 939 | U | 3/2013 |
| DE | 20 2004 005 019 | U1 | 6/2004 |
| DE | 10 2016 225 385 | A1 | 6/2018 |
| EP | 3 034 752 | A1 | 6/2016 |
| JP | 2017-193944 | A | 10/2017 |
| WO | 2006/021844 | A1 | 3/2006 |
| WO | 2012/095831 | A1 | 7/2012 |
| WO | 2018/065871 | A1 | 4/2018 |

* cited by examiner

FITTING ARRANGEMENT FOR A LEAF THAT CAN BE MOVED AWAY IN PARALLEL AND CLOSURE ARRANGEMENT FOR A BUILDING OPENING

CROSS-REFERENCE TO RELATED APPLICATIONS

This continuation application claims priority to PCT/EP2020/071159 filed on Jul. 27, 2020 which has been published as WO 2021/018850 A1 and also the German patent application No. 10 2019 211 424.5 dated Jul. 31, 2019 and German patent application No. 10 2019 216 524.9 dated Oct. 28, 2019, the entire contents of which all applications are fully incorporated herein with these references.

DESCRIPTION

Field of the Invention

The invention relates to a fitting arrangement for a leaf of a sliding window or a sliding door that can be moved away in parallel, comprising a control unit having a mounting part for fixing on the leaf and an adjusting part which is displaceable relative to the mounting part for moving the leaf away in parallel. The invention also relates to a closure arrangement, in particular a sliding window or a sliding door, for a building opening, comprising a frame, a control unit having a mounting part fixed to the leaf and an adjusting part which is displaceable relative to the mounting part, a leaf which, in a closed position, can, by means of the control unit, be brought up to the frame and moved away from the frame in parallel, so that said leaf is displaceable along a guide rail of the frame.

Background of the Invention

A fitting arrangement of the type in question and a closure arrangement of the type in question are known from DE 10 2016 225 385 A1.

Sliding windows or sliding doors are often designed having a leaf that can be moved away from a frame in parallel. The leaf can be placed or pressed against the frame in order to close the window or door. For opening, the leaf is removed from the frame, a parallel alignment of the frame and leaf being maintained. In this parallel moved-away position, the leaf can be moved to clear a window or door opening. In comparison with sliding windows or sliding doors in which the leaf is lifted to open, sliding windows and sliding doors can be sealed more effectively with a leaf that can be moved away in parallel.

In order to close a sliding window or a sliding door with a leaf that can be moved away in parallel, the leaf is first displaced along the frame into an end position and then moved towards the frame and pressed against it in a sealing manner. The end position is typically defined by a stop between the frame and the leaf. In particular with heavy leaves and/or swinging operation, the leaf may rebound from the stop, so that the leaf cannot be closed. When the leaf rebounds, great forces also act, which in the long term can lead to damage to the sliding window or the sliding door or the anchoring thereof to a building.

EP 3 034 752 A2 discloses a lift-and-slide door, the leaf of which is lifted upward to open. The known lift-and-slide door comprises, on an upper end face which faces a frame, a groove in which a housing of a draw-in device is mounted. A catch is movably mounted on the housing and can be coupled to a projection on a holder in order to brake the sliding door when it moves into an end position. The holder is fixed to an adapter profile on the frame above the draw-in device. The catch is fixed to a piston rod in a damping direction and is guided so that it can be displaced in a direction perpendicular to the damping direction.

WO 2012/095831 A1 discloses a dampened fitting for a sliding leaf or a tilt-and-slide leaf for the controlled movement of the leaf from a moved-away position into a closed position. Two movement elements can be moved in the longitudinal direction. A longitudinal movement of the leaf is thus possible. The two movement elements are connected via a connecting rod, which keeps them at a fixed distance from one another and allows them to move with one another. An adjusting arm is pivotably attached to each of the two movement elements. A move-away latching keeps the arms in an open position while the fitting moves over the movement elements.

The leaf that can be moved away in parallel in accordance with DE 10 2016 225 385 A1, mentioned at the outset, is guided on the upper side on the frame by control units with guide rollers. There is therefore a lack of installation space for conventional draw-in devices.

SUMMARY OF THE INVENTION

Object of the Invention

The object of the invention is to provide a fitting arrangement for a leaf that can be moved away in parallel and a closure arrangement having a leaf that can be moved away in parallel, which take up little installation space and can be conveniently operated.

DESCRIPTION OF THE INVENTION

This object is achieved according to the invention by a fitting arrangement according to claim 1 and a closure arrangement according to claim 10. The dependent claims each specify preferred embodiments.

Fitting arrangement according to the invention:

According to the invention, a fitting arrangement is provided for a leaf of a sliding window or sliding door that can be moved away in parallel. The fitting arrangement is used to connect the leaf to a frame that is typically fixed to the building.

The fitting arrangement comprises a control unit having a mounting part for fixing on the leaf and an adjusting part which is displaceable relative to the mounting part for moving the leaf away in parallel. The control unit allows the leaf to be moved away (removed) from the frame or brought up to the frame so that it comes to rest against the frame. Apart from that, when the leaf is moved away from the frame, an orientation of the leaf relative to the frame typically remains unchanged. In the moved-away position, the leaf extends parallel to the frame or the leaf in the position placed against the frame. The moving-away movement can extend perpendicularly to a plane of extension of the leaf. The fitting arrangement can have a further control unit. The fitting arrangement can also allow the leaf to be tilted relative to the frame.

In the mounted state of the fitting arrangement, the mounting part is rigidly connected to the leaf and cannot be moved relative thereto. The adjusting part is movable relative to the mounting part and therefore relative to the leaf, in particular perpendicularly to a plane of extension of the leaf. In the mounted state, the adjusting part is typically displaceably guided along the frame in a guide rail of the frame.

Directional indications, such as laterally or above, relate to the mounted state of the fitting arrangement or the closure arrangement, i.e. the installation position thereof.

According to the invention, the fitting arrangement also has a movement unit which is fastened to the control unit and which comprises an energy storage device and an activation element for the energy storage device. A component of the movement unit can be fastened to the control unit in a detachable or non-detachable manner. A component of the movement unit can be held non-displaceably on a component of the control unit, in particular the adjusting part, in at least one spatial direction, preferably in all spatial directions. In the mounted state of the fitting arrangement, the movement unit is used for braking the leaf and/or for supporting a movement, preferably for automatic movement, of the leaf along a guide rail of a frame. The movement unit facilitates the movement of the leaf, i.e. it simplifies the operation to that extent and increases the ease of use. Braking the leaf prevents it from hitting the frame hard. This helps to avoid damage and facilitates a subsequent targeted movement, in particular supported or effected by the movement unit, of the leaf. By attaching the movement unit to the control unit, a compact design of the fitting arrangement is obtained. The frame and a leaf spar can therefore be designed to be slim, which is often desired, in particular for aesthetic reasons. Furthermore, the fitting arrangement can be designed to be compatible with existing profiles for frame and/or leaf spars due to the compact design. As a result of the integration of the movement unit and the control unit, the fitting arrangement with the movement unit can consequently be used in existing frames and leaf spars for which such movement support was not previously available.

The energy storage device can store the energy required to support the movement and make it available when required. The energy can typically be stored in the energy storage device in the form of potential mechanical energy.

The energy storage device can have a dissipative effect. The leaf can be braked by means of the fitting arrangement through energy dissipation. In this case, at least some of the energy supplied to the energy storage device is not stored in the energy storage device, at least in a direction of movement of the leaf. Rather, part of the energy supplied is dissipated in the energy storage device and can be given off in the form of heat.

The activation element can interact with the energy storage device, in particular in order to supply energy thereto or to discharge energy therefrom. The activation element advantageously also serves to trigger the energy output from the energy storage device. The activation element typically interacts with a catch of the energy storage device. The activation element can be designed as a pin, a sheet metal part or a projection. The catch can overlap the activation element on two opposite sides, in particular with one prong each, when the activation element interacts with the energy storage device.

The fitting arrangement according to the invention can be part of a closure arrangement according to the invention described herein. Features explained in connection with the closure arrangement can, according to the invention, also be provided in the fitting arrangement.

In a particularly advantageous embodiment, the energy storage device is rigidly connected to the adjusting part. This allows a particularly compact design of the fitting arrangement. In this embodiment, the activation element is typically mounted on the guide rail of the frame.

In an alternative advantageous embodiment, the activation element is rigidly connected to the adjusting part. In the mounted state, the activation element typically extends in the vertical direction. A catch of the energy storage device is typically arranged laterally on the energy storage device in the mounted state. In this embodiment, a height adjustment to compensate for manufacturing and installation tolerances can be dispensed with. In this embodiment, the energy storage device is typically mounted on the frame, in particular the guide rail thereof.

The energy storage device can have a body and a spring-damper unit which is arranged in the body. The body forms an interface for receiving the spring-damper unit. Furthermore, the body can be attached in a simple manner to the control unit or optionally to the frame. The body can be rigid. Alternatively, the body can have two parts that can move relative to one another. A spring element of the spring-damper unit is used to store and release potential energy to support the movement of a leaf with the fitting arrangement. A damper element of the spring-damper unit is used to dissipate mechanical energy, i.e. convert it into heat. A gentle movement of the leaf can be set up by the damping. In particular, a hard impact of the leaf on the frame can be prevented. Damage to the leaf, frame and/or the anchoring thereof can therefore be avoided. The spring-damper unit is preferably designed having a gas spring and/or an oil damper. Such a spring-damper unit can be designed and arranged to be particularly space-saving.

The energy storage device preferably has a catch for the activation element which can be latched on the body in a tensioned position of the spring-damper unit. The spring-damper unit is held in the tensioned position by the latching. In the tensioned position, more potential energy is stored in a spring element of the spring-damper unit than in a relaxed position. In principle, the catch is coupled to the spring-damper unit, in particular arranged on a piston rod of the spring-damper unit. The catch can preferably be released from the latching by the activation element. The energy storage device can then emit the stored energy, in particular with the catch being supported on the activation element.

The spring-damper unit can be connected to the catch via a coupling rod. This can simplify the arrangement of the spring-damper unit and the catch on different sides of the adjusting part, in particular if the body is rigid and the spring-damper unit has a compression spring. The coupling rod can extend in a straight line. A straight coupling rod is particularly stable and can be manufactured inexpensively. The coupling rod can extend through a recess in the adjusting part. The recess allows the coupling rod to be guided from one side of the adjusting part to the other in a space-saving manner.

The spring-damper unit can be connected to the body at one end, preferably in an articulated manner. An articulated connection can simplify the mounting of the spring-damper unit by first establishing the articulated connection and then pivoting the other end of the spring-damper unit into the body. At the other end, the spring-damper unit can have a carriage which is guided displaceably on the body. The carriage is preferably guided on the body in two planes. Tilting of the carriage can thereby be reliably avoided. The coupling rod may engage with (be hinged on) the carriage. This can simplify the mounting of the coupling rod. In particular, the coupling rod can have one or more tapers or thickenings at its end on the carriage side, which tapers or thickenings can be inserted into a corresponding slot of the carriage, the coupling rod being able to be fixed on the carriage after insertion by being axially moved to and against an axial stop.

The movement unit can have a compression spring. A compression spring can be stronger than a tension spring with the same installation space. The embodiment having a compression spring is particularly suitable for an activation element arranged to the side of the energy storage device. For an activation element arranged above the energy storage device, the compression spring can be coupled to the catch via a deflection mechanism. A catch of the movement unit can—as seen from a spring element of the movement unit—be arranged on this side or on the other side of the control unit and/or a guide roller.

Alternatively, the movement unit can have a tension spring. This embodiment is particularly suitable for an activation element arranged above the energy storage device. A catch of the movement unit is typically—as seen from a spring element of the movement unit—arranged on the other side of the control unit and/or a guide roller.

Particularly preferably, the movement unit can be latched to the adjusting part. This allows quick mounting and can bring about reliable fixing. In addition, the latching can be designed for variable positioning of the movement unit on the adjusting part. This allows simple adaptability, for example to different leaf widths. As an alternative or in addition to latching, the movement unit can be screwed or riveted to the adjusting part. A particularly stable connection can thus be obtained. It is also conceivable that the body and the adjusting part are formed in one piece with one another, for example as a common stamped and bent part. A body of the movement unit is preferably connected to the adjusting part in the aforementioned manner.

The fitting arrangement advantageously also has at least one guide roller, preferably two guide rollers. In the mounted state, the fitting arrangement can be guided on a guide rail of the frame via the guide rollers. The guide roller(s) can also ensure the correct alignment of the activation element relative to the energy storage device, in particular to a catch of the energy storage device. The guide roller(s) can be arranged on a body of the energy storage device and/or on the adjusting part.

Closure arrangement according to the invention:

A closure arrangement for a building opening also falls within the scope of the present invention. The closure arrangement can in particular be designed as a sliding window or a sliding door.

The closure arrangement has a frame. The frame is intended for installation in a building. In the mounted state, the frame is typically arranged around the opening of the building. The building opening is typically formed in an outer wall of a building. Alternatively, the building opening can be formed in an inner wall of the building.

The closure arrangement furthermore comprises a control unit having a mounting part fixed to the leaf and an adjusting part which is displaceable relative to the mounting part. The closure arrangement also has a leaf. The mounting part is rigidly connected to the leaf and cannot be moved relative thereto. The adjusting part is movable relative to the mounting part and therefore relative to the leaf, in particular perpendicularly to a plane of extension of the leaf. The control unit is typically arranged at the top of the leaf, in particular on an upper, horizontally extending leaf spar. In the mounted state, the leaf and the frame usually extend in a vertical plane.

In a closed position, the leaf can, by means of the control unit, be brought up to the frame and moved away from the frame in parallel. In the moved-away position, the leaf is displaceable along a guide rail of the frame. Bringing up and moving away are typically possible only in the closed position. The closed position usually corresponds to an end position of the leaf relative to the frame, beyond which the leaf cannot be moved. In order to be able to move the leaf along the guide rail in the moved-away position, the adjusting part is guided displaceably by means of the guide rail. By moving the leaf out of the closed position (in the unblocked direction), the building opening or a portion of the building opening that can be opened and closed by the leaf can be cleared. The closure arrangement can have a non-openable fixed field and/or a further openable leaf. In the closed position, the leaf typically completely covers the building opening or the openable and closable portion of the building opening assigned to the leaf. The closure arrangement can also be designed for tilting the leaf relative to the frame.

When the leaf is in the closed position, it can be moved away (removed) from the frame by means of the control unit or brought up to the frame so that it comes to rest against the frame. Apart from that, when the leaf is moved away from the frame, an orientation of the leaf relative to the frame typically remains unchanged. In the moved-away position, the leaf extends parallel to the frame or the leaf in the position placed against the frame. The moving-away movement can extend perpendicularly to a plane of extension of the leaf.

According to the invention, the closure arrangement has a movement unit fastened to the control unit. The movement unit can serve to support a movement of the leaf along the guide rail. The movement unit preferably allows the leaf to be moved automatically.

Alternatively or—preferably—in addition, the movement unit can serve to brake a movement of the leaf. Braking preferably takes place when the leaf is moved towards the closed position. Removal of the leaf from the closed position is typically not braked. The movement unit facilitates the movement of the leaf, i.e. it simplifies the operation to that extent and increases the ease of use. Braking can avoid hard contact between the leaf and the frame. This protects the components of the closure arrangement and the anchoring thereof on the building. Furthermore, the braking facilitates a subsequent targeted movement of the leaf. In this case, the movement unit is advantageously used to support or automatically move the leaf. By attaching the movement unit to the control unit, a compact design of the fitting arrangement is obtained. The frame and a leaf spar of the leaf can therefore be designed to be slim, which is often desired, in particular for aesthetic reasons. Furthermore, the fitting arrangement can be designed to be compatible with existing profiles for frame and/or leaf spars due to the compact design. As a result of the integration of the movement unit and control unit, the movement unit can consequently be used in existing frames and leaves for which such movement support was not previously available.

The movement unit typically has an energy storage device and an activation element for the energy storage device. The energy storage device can store the energy required to support the movement and make it available when required. The energy can typically be stored in the energy storage device in the form of potential mechanical energy.

The energy storage device can have a dissipative effect. The leaf can be braked by means of the fitting arrangement through energy dissipation. In this case, at least some of the energy supplied to the energy storage device is not stored in the energy storage device, at least in a direction of movement of the leaf. Rather, part of the energy supplied is dissipated in the energy storage device and can be given off in the form of heat.

The activation element can interact with the energy storage device, in particular in order to supply energy thereto or to discharge energy therefrom. The activation element advantageously also serves to trigger the energy output from the energy storage device. The activation element typically interacts with a catch of the energy storage device. The activation element can be designed as a pin, a sheet metal part or a projection. The catch can overlap the activation element on two opposite sides, in particular with one prong each, when the activation element interacts with the energy storage device.

The closure arrangement according to the invention can have an above-described fitting arrangement according to the invention. In particular, the control unit and the movement unit can be part of a fitting arrangement according to the invention. Features explained in connection with the fitting arrangement can, according to the invention, also be provided for the closure arrangement.

In a preferred embodiment, the movement unit is designed to assist in bringing the leaf into the closed position. The movement unit therefore supports closing of the closure arrangement. The movement unit is preferably designed to automatically bring the leaf into the closed position. This further facilitates the closing of the closure arrangement. Typically, the movement unit is designed to first brake the leaf when it closes and then to assist or bring about its movement into the closed position. Braking can prevent the leaf from hitting the frame. In this way, on the one hand, damage can be avoided. On the other hand, transferring the leaf into the closed position in a defined manner is facilitated. The movement unit typically acts on the leaf when it has reached a predefined distance from the closed position when moving in the direction toward the closed position. A catch of the movement unit can come into engagement there with an activation element. When the closure arrangement is opened, energy is typically supplied to the movement unit and stored therein for subsequent closing.

Alternatively or additionally, the movement unit can be designed to assist in removing the leaf from the closed position. The movement unit therefore supports opening of the closure arrangement. The movement unit is preferably designed to automatically remove the leaf from the closed position. This further facilitates the opening of the closure arrangement. The movement unit typically acts on the leaf until it has reached a predefined distance from the closed position when moving in the direction out of the closed position. A catch of the movement unit can disengage there from an activation element. When the closure arrangement is closed, energy is typically supplied to the movement unit and stored therein for subsequent opening.

In a particularly preferred embodiment of the closure arrangement, an activation element of the movement unit is arranged laterally next to an energy storage device of the movement unit. The activation element then does not hinder the movement of components arranged above, such as guide rollers, for example. This embodiment is particularly suitable for a movement unit having a compression spring. The activation element can be arranged on the adjusting part or the frame. The activation element can be arranged fore or, preferably, aft of the control unit in the closing direction.

Alternatively, an activation element of the movement unit can be arranged above an energy storage device of the movement unit. This allows a particularly compact construction in the horizontal direction. This embodiment is particularly suitable for a movement unit having a tension spring. The activation element is typically arranged on the frame, preferably on, in particular within, the guide rail. The activation element is typically arranged fore of the control unit in the closing direction, in particular even when the leaf is in the closed position. This can prevent the activation element from hindering the movement of the control unit along the guide rail.

The leaf preferably has a mechanism for controlling a movement of the adjusting part of the control unit with respect to the mounting part. This allows convenient operation of the closure arrangement. By operating the mechanism, the adjusting part can be moved relative to the mounting part. For this purpose, the mechanism is typically supported on the adjusting part and the mounting part. In the mounting part and the adjusting part of the control unit, a gate can be formed in each case into which a pin of a drive rod of the mechanism engages. A gate portion in the adjusting part preferably extends at an angle to a gate portion in the mounting part. By moving the pin in the gates, the adjusting part is moved relative to the mounting part. The mechanism can have a handle, in particular with a rotation of the handle causing a displacement of the drive rod.

The closure arrangement can comprise a further control unit having a further mounting part fixed to the leaf and a further displaceable adjusting part. The further control unit can passively follow a movement of the control unit. Alternatively, a movement of the further adjusting part of the further control unit with respect to the further mounting part can be actively controlled by the mechanism (as described above).

For further features of the fitting arrangement, reference is made to DE 10 2016 225 385 A1. In particular, the mounting part and the adjusting part of the control unit of the present invention can be designed like the guide part and the control part, respectively, of the displacement arrangement according to DE 10 2016 225 385 A1 and interact as described therein. A support roller bearing can be arranged between the mounting part and the adjusting part, as described in DE 10 2016 225 385 A1.

Further features and advantages of the invention can be found in the description and the figures of the drawings. The aforementioned features and those which are to be explained below can each be used individually for themselves or for a plurality of expedient combinations of any kind. The embodiments shown and described are not to be understood as an exhaustive enumeration but rather have exemplary character for the description of the invention.

BRIEF DESCRIPTION OF THE DRAWINGS

The invention is shown in the drawings, in which.

DETAILED DESCRIPTION OF THE PREFERRED EMBODIMENTS

Figure 1:
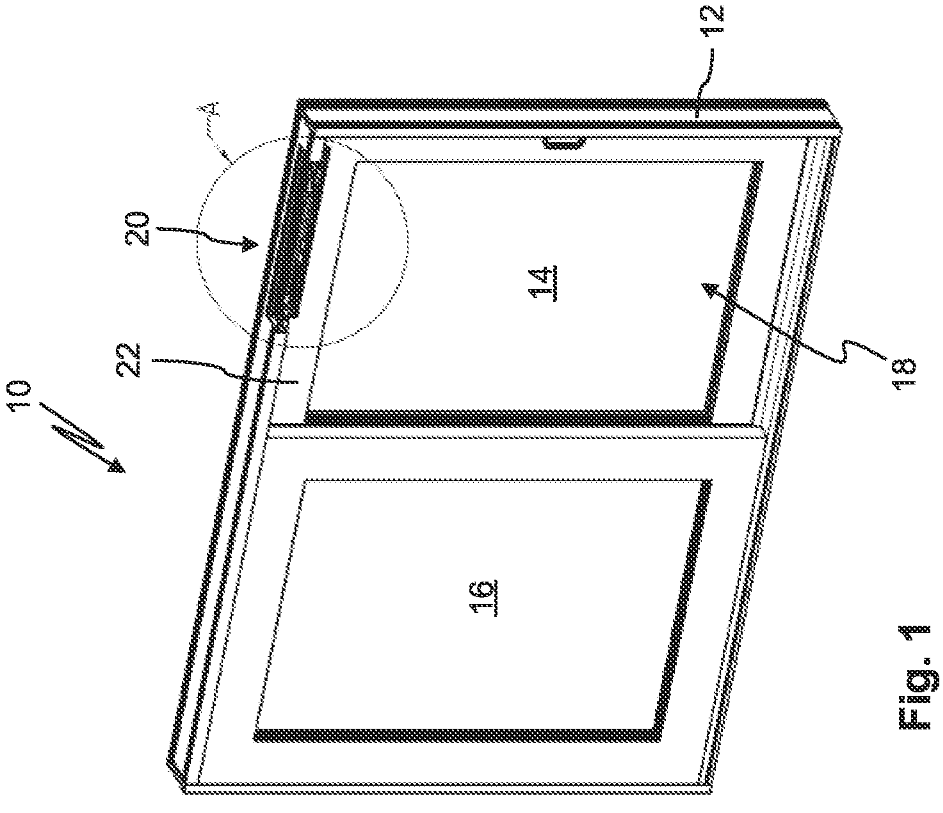
FIG. 1 is a schematic perspective view of a closure arrangement according to the invention in the form of a sliding door comprising a fitting arrangement according to the invention, which connects an openable leaf to a frame.

FIG. 1 shows a closure arrangement 10 for a building opening. The closure arrangement 10 is designed as a sliding door. The closure arrangement 10 comprises a frame 12 and a movable leaf 14. The closure arrangement 10 here also comprises a non-openable fixed field 16. In FIG. 1, the leaf 14 is in a closed position in which it covers a door opening 18. By displacing the leaf 14 in front of the fixed field 16, the door opening 18 can be cleared. In order to open the closure arrangement 10, the leaf 14 is moved away from the frame 12 while maintaining its parallel orientation.

The leaf 14 is held on the frame 12 and guided via a fitting arrangement 20. The fitting arrangement 20 is arranged in the region denoted by “A” in FIG. 1. In the region “A” in FIG. 1, the frame 12 and an upper leaf spar 22 are shown in broken form.

Figure 2:
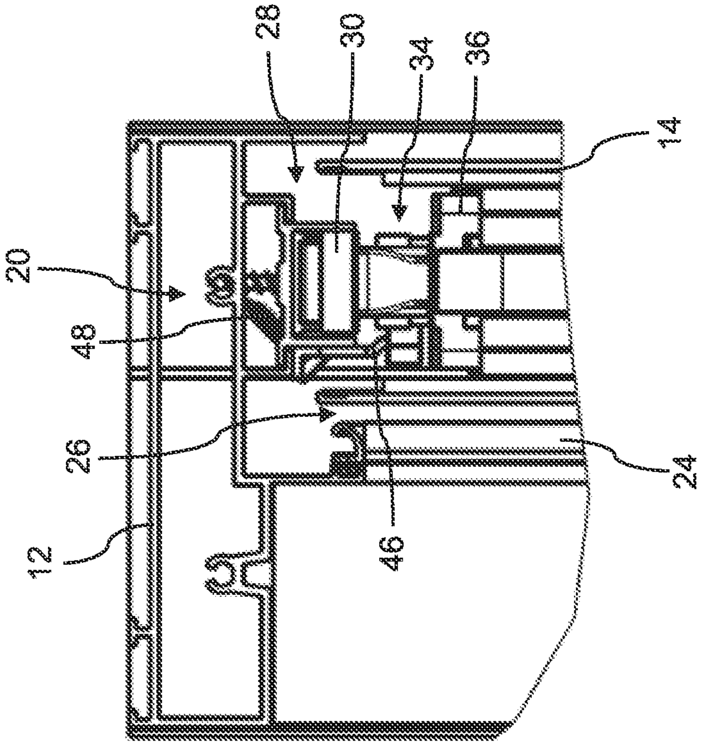
FIG. 2 is a schematic cross section through the closure arrangement of FIG. 1 in the region A.
Figure 3:
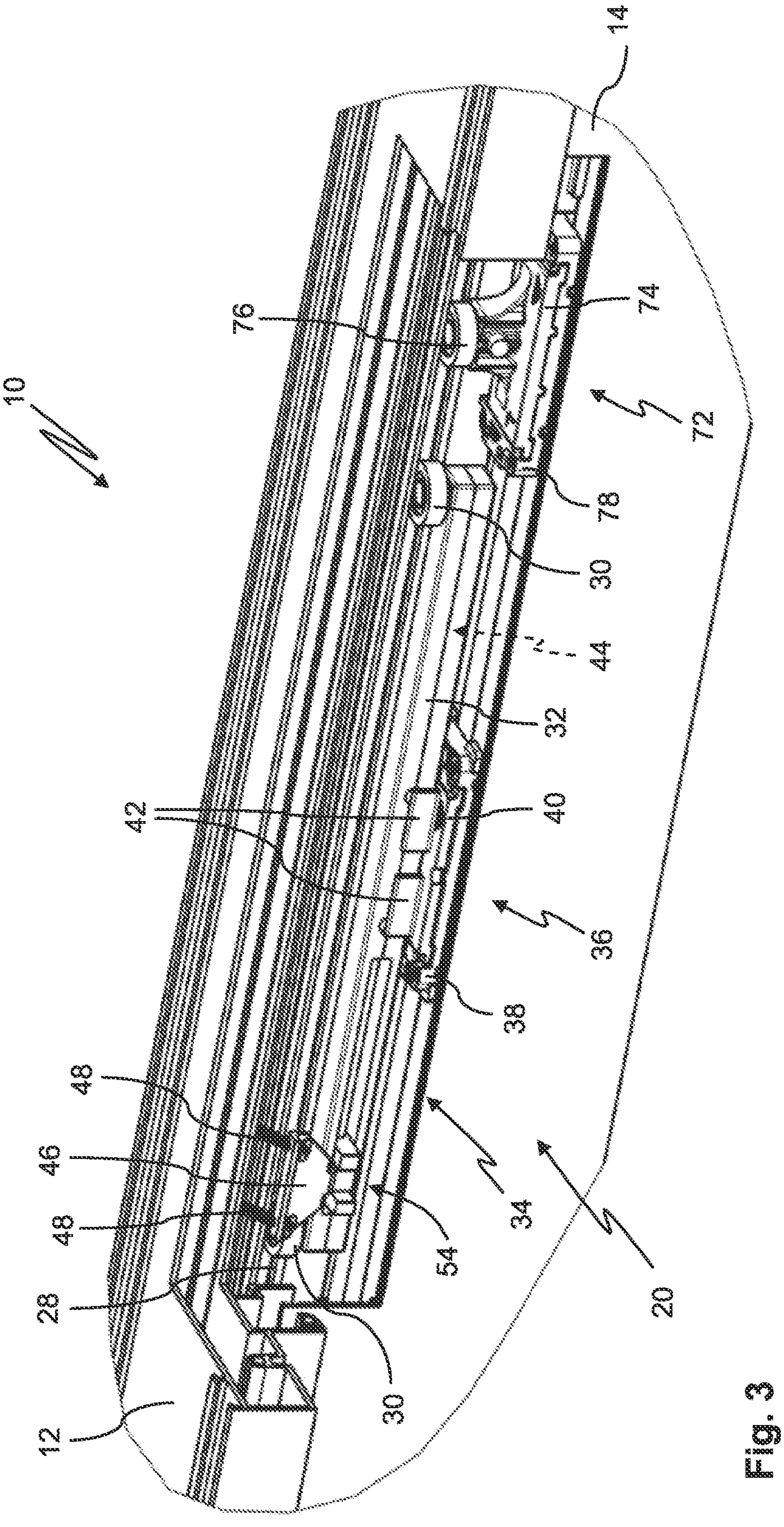
FIG. 3 is an enlarged schematic view of the region A of the closure arrangement of FIG. 1.

FIG. 2 shows a cross section through the closure arrangement 10 of FIG. 1 in the region “A.” FIG. 3 shows the region “A” of FIG. 1 in an enlarged perspective view.

In the closed position shown in FIG. 1, the leaf 14 can be pressed against the frame 12 and moved away from the frame 12. In FIG. 2, the leaf 14 is in a parallel moved-away position. There is a gap 26 between the leaf 14 and a peripheral seal 24 of the frame 12. In the moved-away position, the leaf 14 can be displaced along a guide rail 28 of the frame 12 in order to clear or close the door opening 18.

Figure 4:
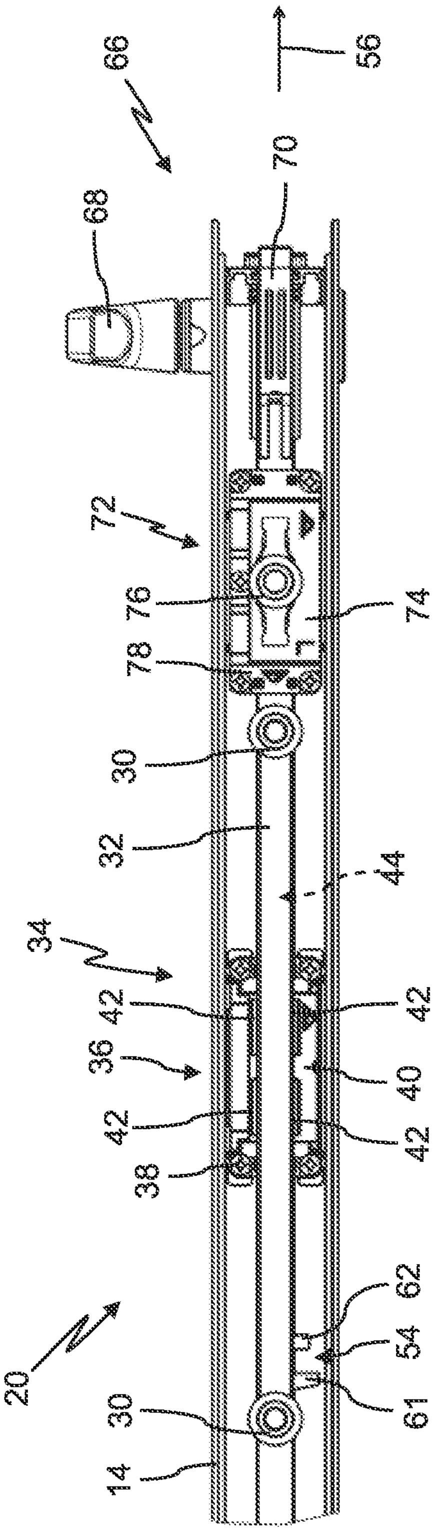
FIG. 4 is a schematic plan view of the leaf and the fitting arrangement of the closure arrangement of FIG. 1.
Figure 5:
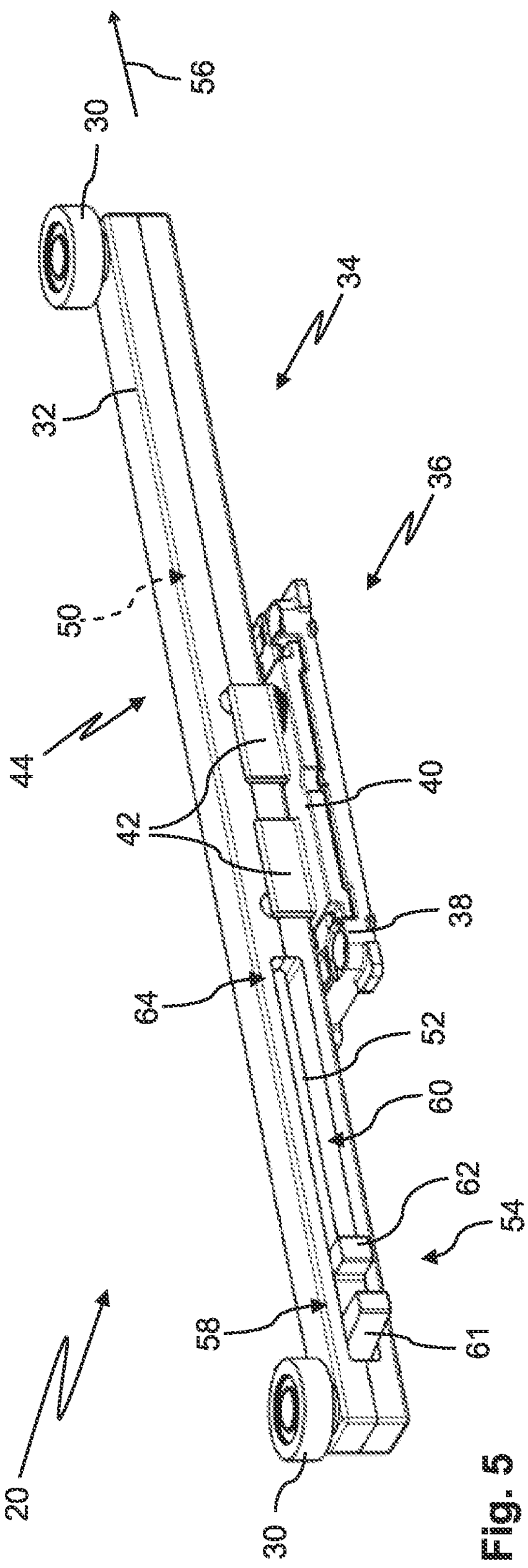
FIG. 5 is a schematic perspective view of the fitting arrangement of the closure arrangement of FIG. 1 comprising a control unit having a mounting part and an adjusting part displaceably mounted thereon, on which a movement unit is latched, on which movement unit two guide rollers are arranged.
Figure 6:
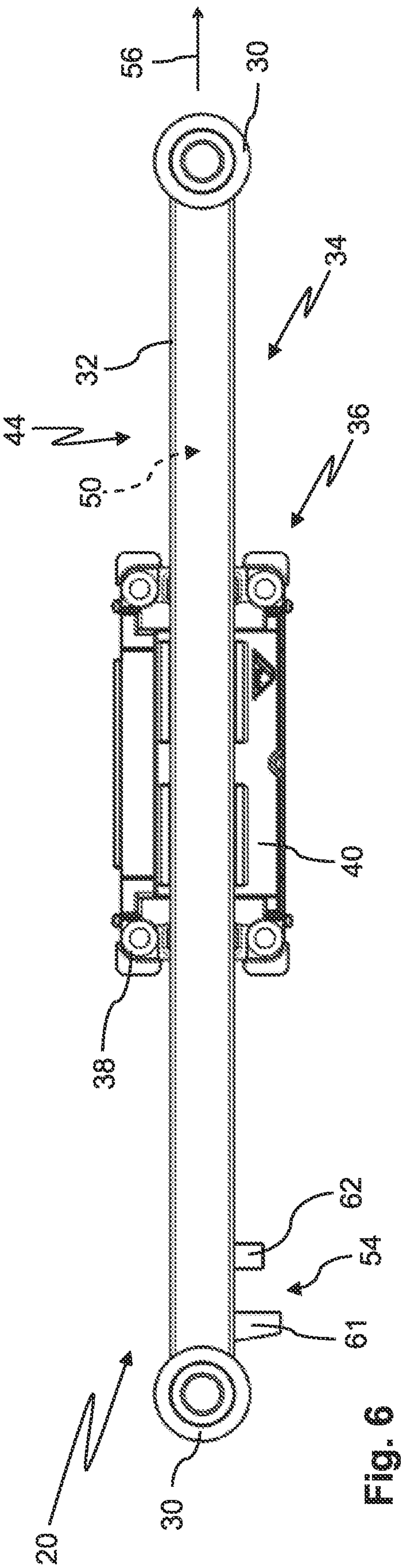
FIG. 6 is a schematic plan view of the fitting arrangement of FIG. 5.

The design and function of the fitting arrangement 20 are described in more detail below with additional reference to FIGS. 4, 5 and 6. FIG. 4 shows the fitting arrangement 20 and the leaf 14 in a plan view. FIGS. 5 and 6 show the fitting arrangement 20 in a perspective view and a plan view, respectively.

The fitting arrangement 20 engages into the guide rail 28 with two guide rollers 30. The guide rollers 30 are arranged on the upper side on a body 32 of a movement unit 34 of the fitting arrangement 20. The body 32 is fastened to a control unit 36. The control unit 36 has a mounting part 38 which is non-displaceably fixed to the leaf 14. The control unit 36 also has an adjusting part 40, which is displaceably held and guided on the mounting part 38. The body 32 of the movement unit 34 is fastened to the adjusting part 40. Here, the adjusting part 40 and the body 32 are latched together. For this purpose, the adjusting part 40 has four latching elements 42 arranged opposite one another in pairs.

The movement unit 34 serves to support a movement of the leaf 14 along the guide rail 28. Here, the movement unit 34 serves to automatically bring the leaf 14 into the closed position when the leaf 14 has almost reached the closed position during closing. For this purpose, the movement unit 34 has an energy storage device 44 (mainly covered by the body 32 in FIGS. 3 to 6).

The energy storage device 44 interacts with an activation element 46 of the movement unit 34; cf. FIGS. 2 and 3. The activation element 46 is arranged on the frame 12. Here, the activation element 46 is fastened to the guide rail 28 by means of a screw connection, in particular by means of two screws 48.

The energy storage device 44 comprises a spring-damper unit 50 (hidden by the body 32), which is designed here having an oil-damped gas spring. A catch 54 is connected via a piston rod 52 (see FIG. 5) to the spring-damper unit 50. The spring-damper unit 50 and the catch 54 are arranged on different sides of the control unit 36. The spring-damper unit 50 presses the catch 54 into the position shown at the rear end 58 in the closing direction 56 of a groove 60. The position shown of the catch 54 corresponds to a relaxed position of the spring-damper unit 50.

The catch 54 protrudes laterally out of the body 32. The activation element 46 (cf. FIGS. 2 and 3) is accordingly arranged laterally next to the energy storage device 44. The catch 54 has two legs 61, 62 (cf. FIGS. 4 to 6) in order to engage over the activation element 46 on both sides. In other words, the activation element 46 can be received between the legs 61, 62 of the catch 54.

The two legs 61, 62 are of different lengths. The shorter leg 62 is arranged at the front in the closing direction 56. When the leaf 14 is opened, the spring-damper unit 50 is tensioned by the catch 54 holding onto the activation element 46 until the catch 54 has reached the front end 64 of the groove 58 in the closing direction 56. In this tensioned position of the spring-damper unit 50, the catch 54 is pivoted so that the short leg 62 is drawn into the body 32. As a result, the catch 54 releases the activation element 46; the leaf 14 can be opened further. In the tensioned position of the spring-damper unit 50, the pivoted-in catch 54 latches on the body 32, so that the potential energy supplied to the spring-damper unit 50 when the leaf 14 is opened is stored.

When the leaf 14 is closed, shortly before reaching the closed position, the longer leg 61 of the catch 54 strikes the activation element 46. The catch 54 is thereby released from the latching and the shorter leg 62 pivots outward so that the catch 54 overlaps the activation element 46 on both sides. The spring-damper unit 50 now brakes the leaf 14. Preferably, the spring-damper unit can bring about greater braking of the leaf 14 when the leaf 14 is closed more quickly. Braking the leaf 14 prevents it from hitting the frame 12 hard and bouncing back therefrom. After braking, the spring-damper unit 50 presses the leaf 14 into the closed position. In the process, the spring-damper unit 50 relaxes until the catch 54 reaches the rear end 58 of the groove 60 (corresponding to the closed position of the leaf 14). In this position, potential energy can still be stored in the spring-damper unit 50. In other words, the spring-damper unit 50 can also exert a force acting in the closing direction 56 on the leaf 14 in the closed position. As a result, the movement unit 34 is able to bring the leaf 14 reliably into the closed position.

Figure 12:
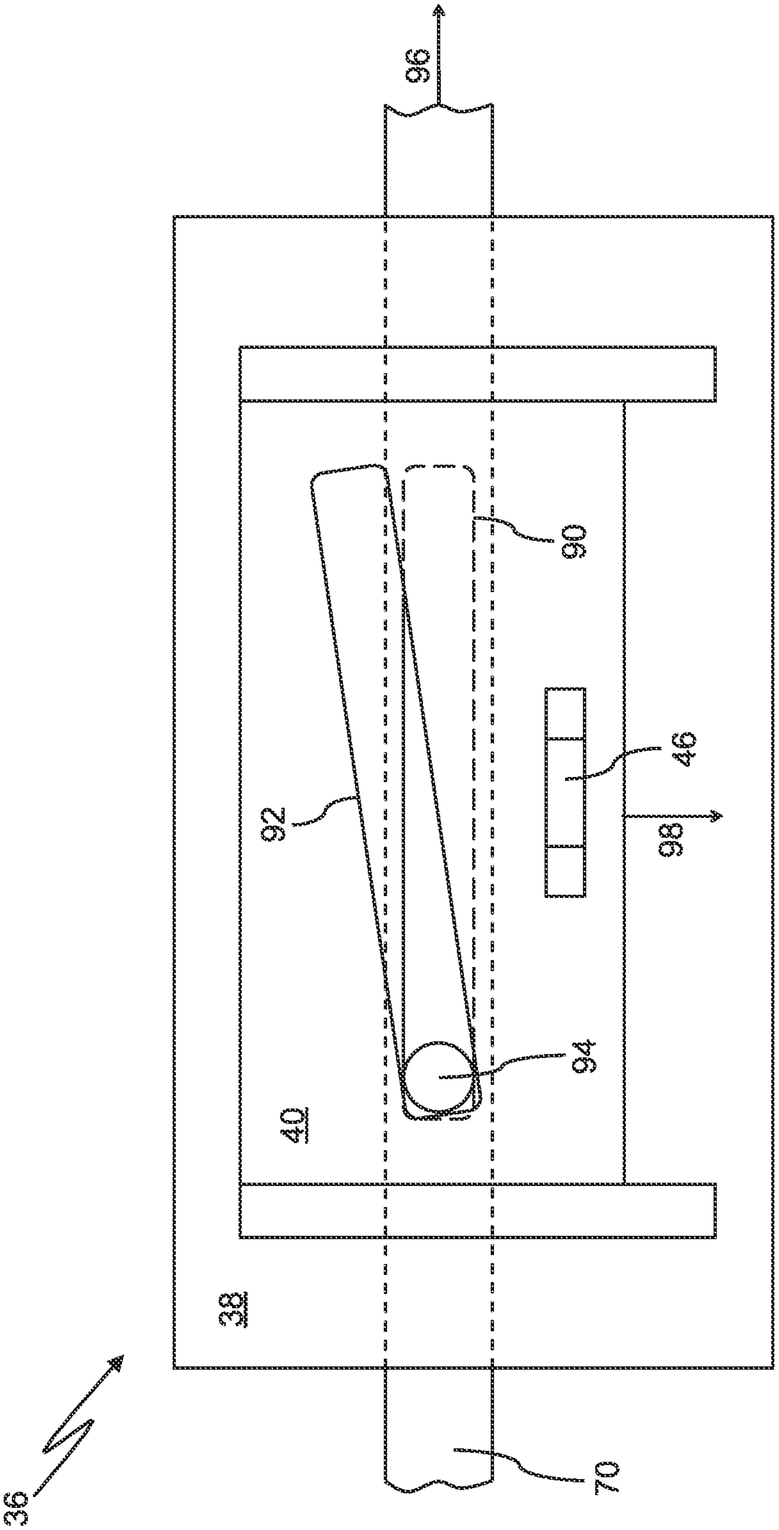
FIG. 12 shows a control unit for a fitting arrangement according to the invention, an activation element for a movement unit being arranged on an adjusting part of the control unit which is displaceable with respect to a mounting part.

A mechanism 66 is provided for bringing the leaf 14 up to the frame 12 or moving it away from the frame 12 in the closed position; see in particular FIG. 4. The mechanism 66 comprises a handle 68. The handle 68 is arranged on the leaf 14. The handle 68 is coupled to a drive rod 70. By turning the handle 68, the drive rod 70 is displaced. The drive rod 70 is coupled to the control unit 36 in a manner not shown here. The drive rod 70 can, for example—as shown in FIG. 12—have a pin 94 which engages in gates in the mounting part 38 and the adjusting part 40. When the drive rod 70 is displaced, the adjusting part 40 is displaced relative to the mounting part 38, so that the leaf 14 is placed against the frame 12 or is moved away from the frame 12.

As can be seen from FIGS. 3 and 4, a further control unit 72 is arranged on the leaf 14. The further control unit 72 is designed similarly to the control unit 36. A further guide roller 76 is arranged on another adjusting part 74 of the further control unit 72. The further adjusting part 74 is movable with respect to a further mounting part that is fixed to the leaf 78. The further control unit 72 can be coupled to the mechanism 66 so that the movement of the further adjusting part 74 with respect to the further mounting part 78 can be actively controlled. Alternatively, the further control unit 72 can follow the movement of the leaf 14 passively.

Figure 7:
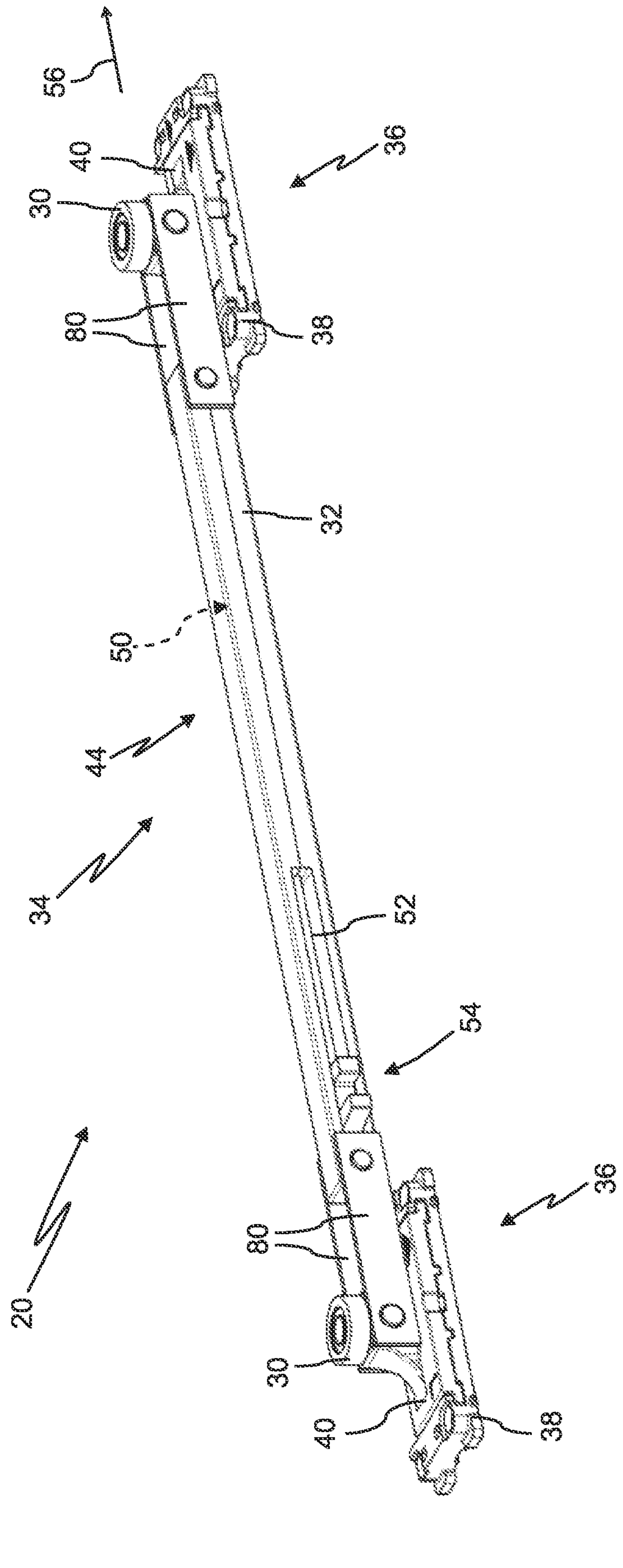
FIG. 7 is a schematic perspective view of a fitting arrangement according to the invention comprising two control units, between which a movement unit is arranged, and on each of which a guide roller is arranged.

FIG. 7 shows a second embodiment of a fitting arrangement 20. A movement unit 34 of the fitting arrangement 20 is coupled to two control units 36 via tabs 80. A guide roller 30 is arranged on each of the adjusting parts 40 of the control units 36 on the upper side. At least one of the control units 36 is actively controlled; both control units 36 are preferably actively controlled. Otherwise, the movement unit 34 and the control units 36 of the fitting arrangement 20 of FIG. 7 correspond in design and function to the movement unit 34 and the control unit 36, respectively, of the fitting arrangement 20 according to the previously described FIGS. 5 and 6.

Figure 8:
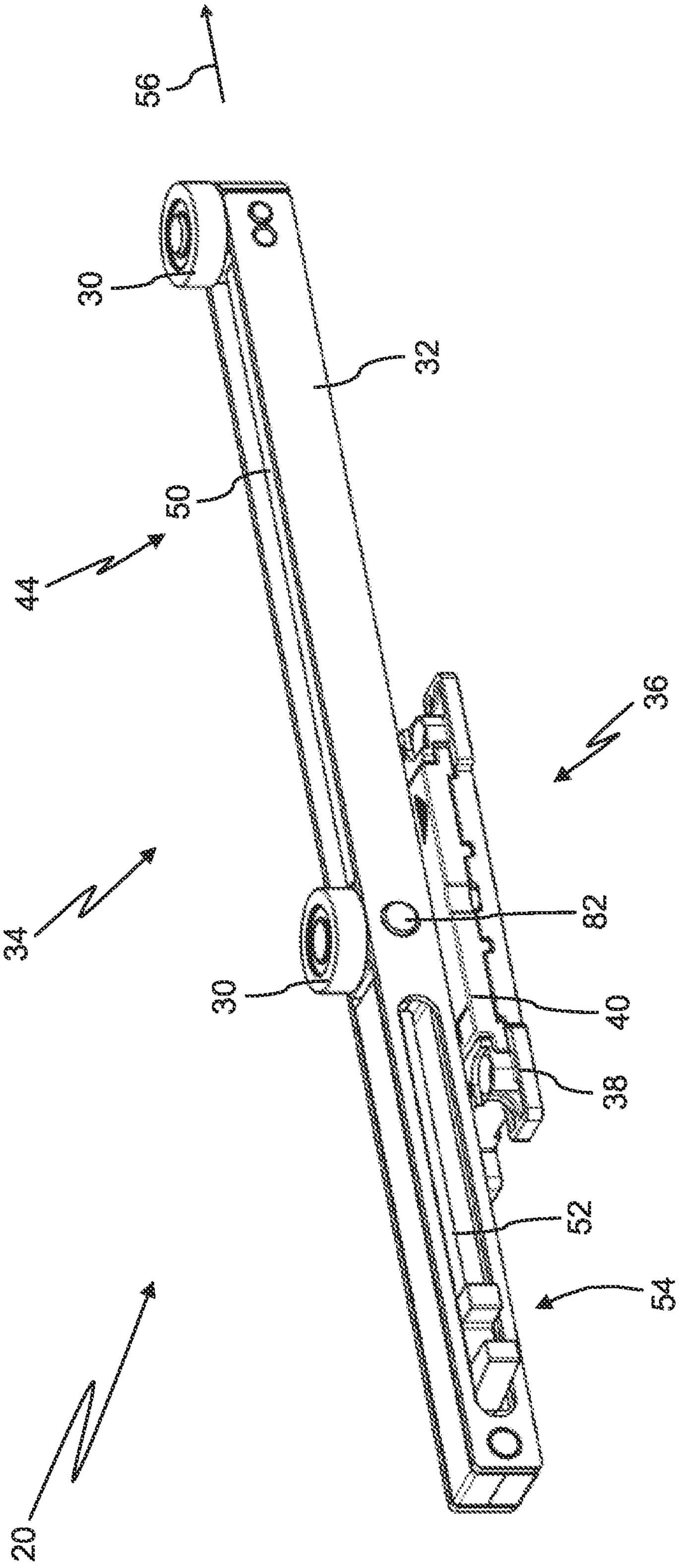
FIG. 8 is a schematic perspective view of a fitting arrangement according to the invention comprising a control unit to which a movement unit is fastened, a catch and a spring-damper unit of the movement unit being arranged on different sides of the control unit.

FIG. 8 shows a third embodiment of a fitting arrangement 20. A movement unit 34 is connected, in particular via a bolt 82, to a single adjusting part 40 of a control unit 36. A guide roller 30 is preferably arranged on the upper side of the adjusting part 40 of the control unit 36. A spring-damper unit 50 and a catch 54 of the movement unit 34 are preferably arranged on different sides of the control unit 36. At its end facing away from the catch 54, a body 32 of the movement unit 34 carries a further guide roller 30. Otherwise, the movement unit 34 and the control unit 36 of the fitting arrangement 20 of FIG. 8 correspond in design and function to the movement unit 34 and the control unit 36, respectively, of the fitting arrangement 20 according to the previously described FIGS. 5 and 6.

Figure 9:
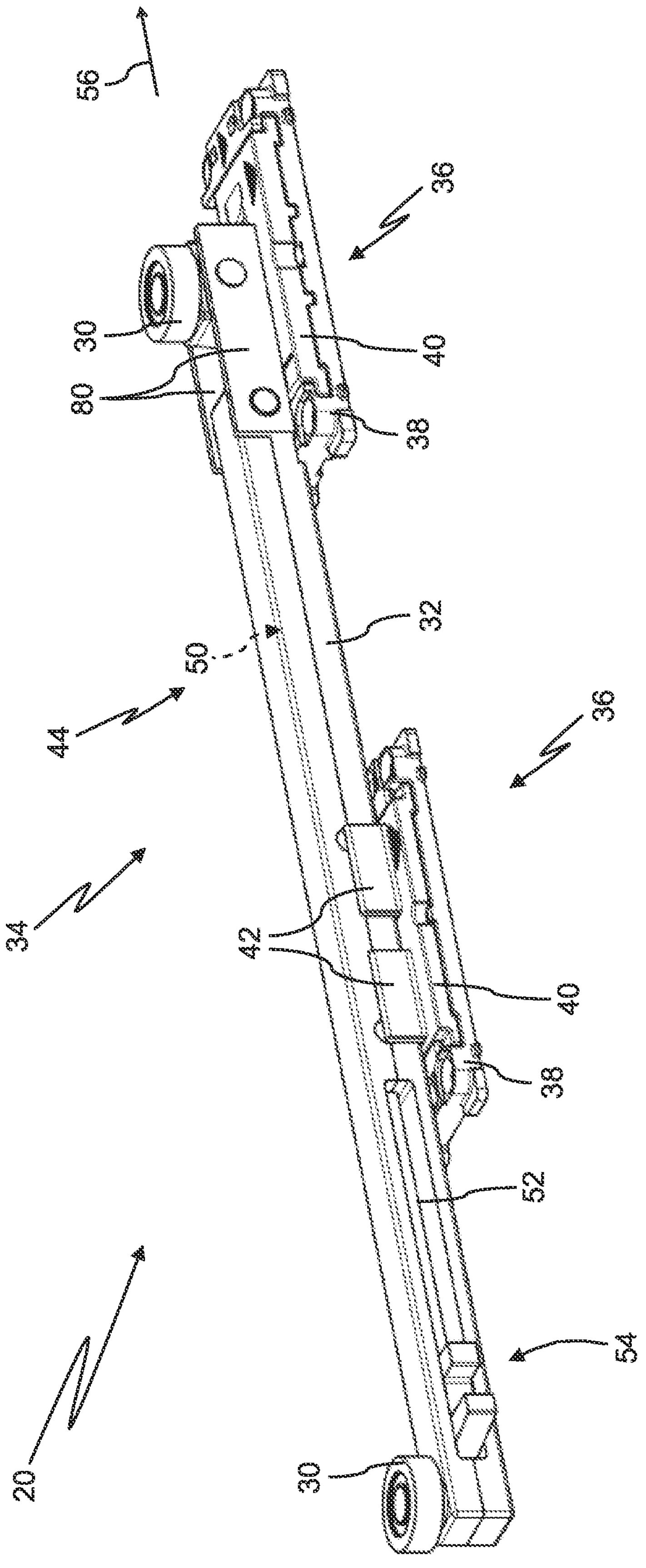
FIG. 9 is a schematic perspective view of a fitting arrangement according to the invention comprising two control units and a movement unit, which movement unit has a spring-damper unit with a compression spring.

FIG. 9 shows a fourth embodiment of a fitting arrangement 20. A movement unit 34 is latched to a first control unit 36, here in a central region of a body 32 of the movement unit 34. In the closing direction 56 at the front, a second control unit 36 is connected to the body 32 via tabs 80. A first guide roller 30 is arranged on the upper side of an adjusting part 40 of the second control unit 36. A second guide roller 30 is arranged at the rear end of the body 32 in the closing direction 56. A spring-damper unit 50 and a catch 54 of the movement unit 34 are arranged on different sides of the control unit 36. Otherwise, the movement unit 34 and the control units 36 of the fitting arrangement 20 of FIG. 9 correspond in design and function to the movement unit 34 and the control unit 36, respectively, of the fitting arrangement 20 according to the previously described FIGS. 5 and 6 and with respect to the second control unit 36 of the fitting arrangement 20 according to the previously described FIG. 7.

Figure 10:
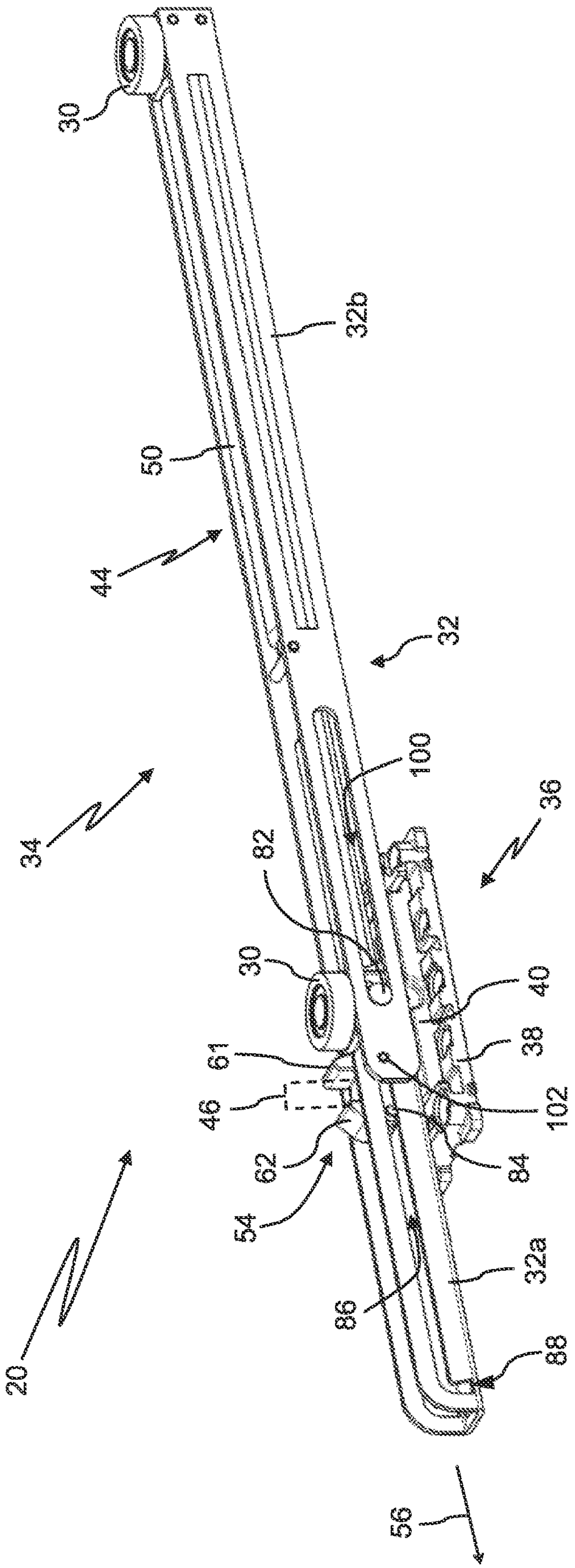
FIG. 10 is a schematic perspective view of a fitting arrangement according to the invention having a control unit and a movement unit, a catch of the movement unit facing upward and being able to be latched on a body of the movement unit in a tensioned position of a spring-damper element.

FIG. 10 shows a fifth embodiment of a fitting arrangement 20. A guide roller 30 is arranged on the upper side of an adjusting part 40 of the control unit 36 and on a rear end in the closing direction 56 of a body 32 of a movement unit 34. Here, a spring-damper unit 50 of the movement unit 34 is designed having a compression spring. As a result of the arrangement of the spring-damper unit 50, a catch 54 is pretensioned into the position shown by means of the compression spring; there is consequently a conversion of the pushing effect of the spring into a tensile effect on the catch 54. The spring-damper unit 50 and the catch 54 are arranged on different sides of the control unit 36. Here, the catch 54 has legs 61, 62 pointing upward in order to interact with an activation element 46 (only shown schematically) arranged above the spring-damper unit 50 (i.e. further up in the vertical direction). Here, the catch 54 and the activation element 46 are arranged on the control unit 36 in front of the guide roller 30 in the closing direction 56. In the closed position, the guide roller 30 moves in a guide rail 28 until just before the activation element 46. By positioning the activation element 46 and the catch 54 in front of the guide roller 30 and the control unit 36, respectively, in the closing direction 56, the activation element 46 can be arranged within the guide rail 28 without the guide roller 30 colliding with the activation element 46 when a leaf 14 is closed.

The catch 54 engages via pin-like projections 84 into guide grooves 86 of an immovable part **32*a* of the body 32 of the moving unit 34, which immovable part 32*a* is fixed on the adjusting part 40. At the front end in the closing direction 56, the guide grooves 86 each have an angled portion 88. In a tensioned position of the spring-damper unit 50, the pin-like projections 84 of the catch 54 enter the angled portions 88. As a result, on the one hand, the catch 54 is latched on the immovable part 32*a* of the body 32, so that the spring-damper unit 50 remains tensioned. On the other hand, the short leg 62 of the catch 54 is thereby pivoted downward, so that the catch 54 releases the activation element 46 when a leaf with the fitting arrangement 20 is opened. When the leaf is closed, the long leg 61 strikes the activation element 46. As a result, the pin-like projections 84 are lifted out of the angled portions 88, so that the catch 54** is released from the latching and the spring-damper unit 50 can first brake the leaf 14 and then push it into the closed position.

A part 32*b* of the body 32 that is movable with respect to the adjusting part 40 is guided on the adjusting part 40 via a bolt 82. The movable part 32*b* of the body 32 has elongate holes 100, in which the bolt 82 is displaceable. The spring-damper unit 50 is supported on the adjusting part 40 via a piston rod which is concealed in FIG. 10. The movable part 32*b* of the body 32 is connected to the catch 54, here by means of a peg 102. Since the compression spring of the spring-damper unit 50 presses the movable part 32*b* of the body 32 away from the adjusting part 40 counter to the closing direction 56, the catch 54 is pulled by the movable part 32*b* into the position shown toward the adjusting part 40.

Otherwise, the movement unit 34 and the control unit 36 of the fitting arrangement 20 of FIG. 10 correspond in design and function to the movement unit 34 and the control unit 36, respectively, of the fitting arrangement 20 according to the previously described FIG. 8.

Figure 11:
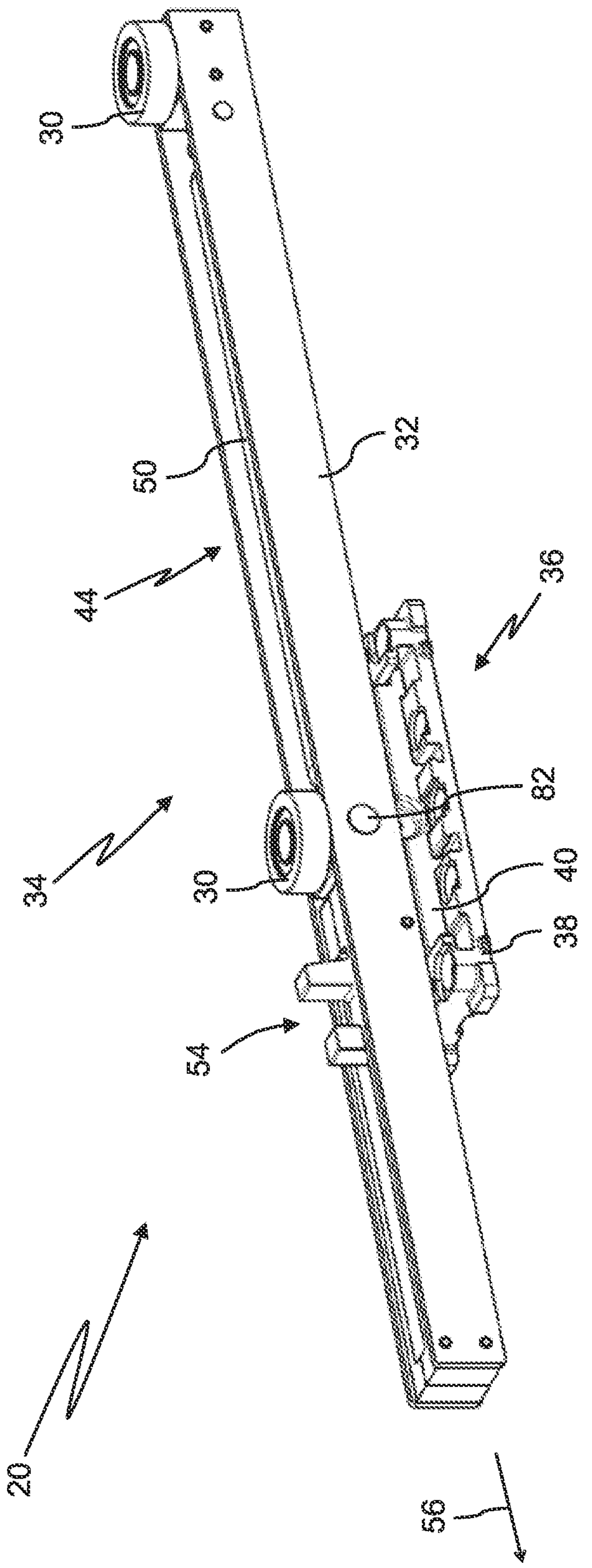
FIG. 11 is a schematic perspective view of a fitting arrangement according to the invention comprising a control unit and a movement unit, which movement unit has a spring-damper unit with a tension spring.

FIG. 11 shows a sixth embodiment of a fitting arrangement 20. The fitting arrangement 20 of FIG. 11 substantially corresponds in design and function to the fitting arrangement 20 according to FIG. 10, although a body 32 and a catch 54 of a movement unit 34 are designed differently here. Here, a spring-damper unit 50 of the movement unit 34 is designed having a tension spring. The tension spring pulls the catch 54 into the position shown.

FIG. 12 shows a control unit 36 for a fitting arrangement. The control unit 36 has a mounting part 38 for fastening to a leaf and an adjusting part 40 which is displaceable relative to the mounting part 38. Here, an activation element 46 of a movement unit, otherwise not shown, of the fitting arrangement is arranged on the adjusting part 40. The activation element 46 projects upward (out of the plane of the drawing) away from the control unit 36.

A first gate portion 90 extending parallel to a drive rod 70 is formed in the mounting part 38. A second gate portion 92 is formed in the adjusting part 40. The gate portion 92 in the adjusting part 40 extends obliquely to the gate portion 90 in the mounting part 38 or obliquely to the drive rod 70. A pin 94 held on the drive rod 70 engages in the two gate portions 90, 92. When the drive rod 70 is displaced, the adjusting part 40 is thereby displaced in a transverse direction relative to the mounting part 38; cf. arrows 96 and 98.

Figure 13A:
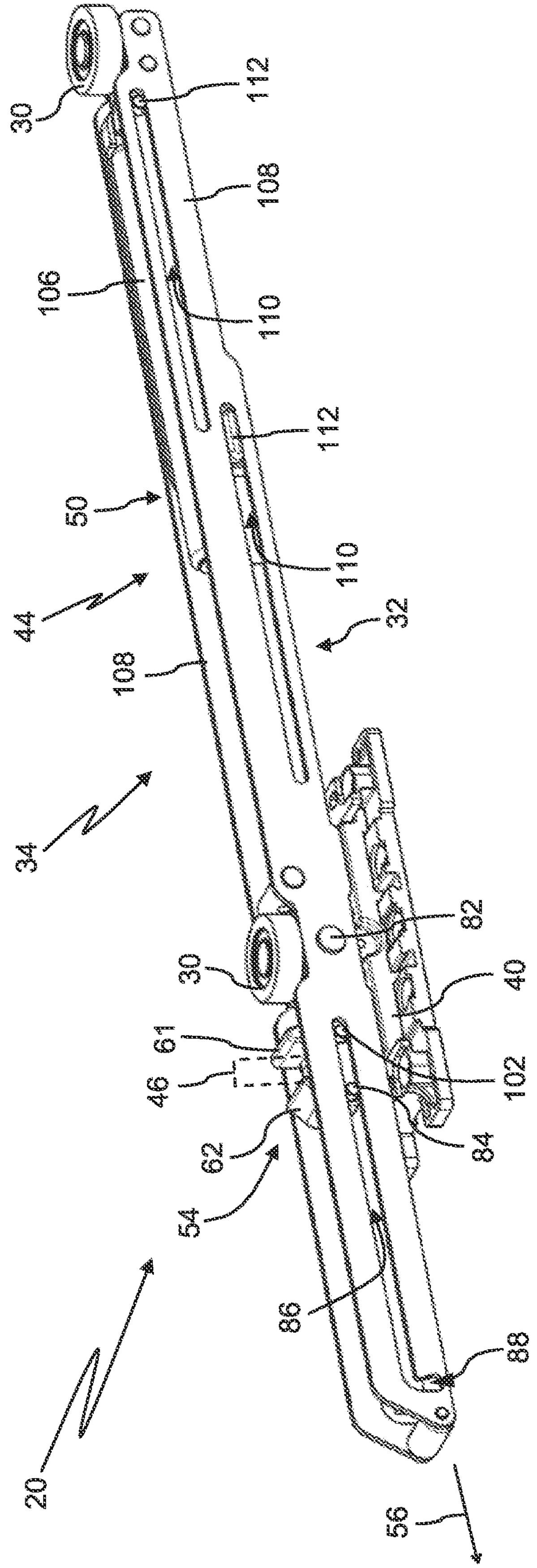
FIG. 13*a* is a schematic perspective view of a fitting arrangement according to the invention, which has a movement unit with a rigid body and with a compression spring, the compression spring being connected to a catch via a coupling rod, the compression spring being in a relaxed position.
Figure 13B:
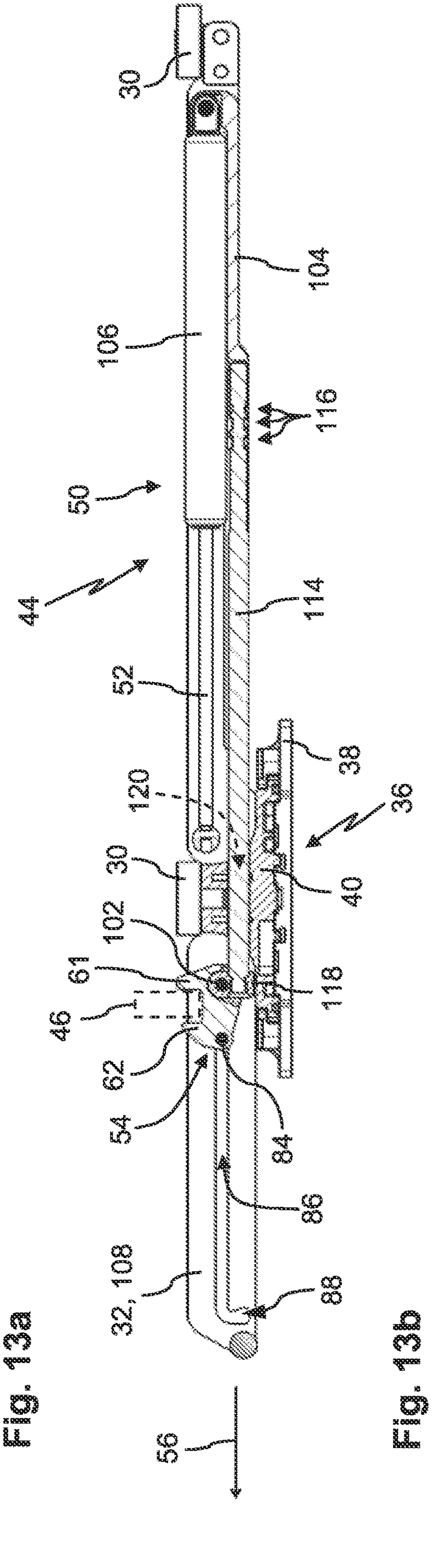
FIG. 13*b* shows the fitting arrangement according to FIG. 13*a* in a schematic longitudinal section.

FIG. 13*a* shows a seventh embodiment of a fitting arrangement 20 in a perspective view. In FIG. 13*b* the fitting arrangement 20 according to FIG. 13*a* is shown in a longitudinal section.

A guide roller 30 is arranged on the upper side of an adjusting part 40 of a control unit 36 and on a rear end in the closing direction 56 of a body 32 of a movement unit 34. Here, a spring-damper unit 50 of the movement unit 34 is designed having a compression spring. The spring-damper unit 50 is arranged in the body 32. Here, the body 32 is rigid overall.

A piston rod 52 of the spring-damper unit 50 is connected in an articulated manner to the body 32, here near the adjusting part 40 with the guide roller 30. The spring-damper unit 50 has a carriage 104 at the other end. A piston housing 106 of the spring-damper unit 50 is received in the carriage 104 and connected to the carriage 104. The carriage 104 is guided on the body 32 such that it can be displaced in a straight line. In order to guide the carriage 104, two side parts 108 of the body 32 each have two guide slots 110. The guide slots 110 each extend in a straight line. Here, the two guide slots 110 are each offset from one another in the side parts 108. The carriage 104 engages into each of the guide slots 110 with one extension 112 in each case.

The spring-damper unit 50 is connected to a catch 54 of the movement unit 34 via a coupling rod 114. The coupling rod 114 can have tapers 116 at one end by means of which it is hooked into the carriage 104. At the other end, the coupling rod 114 is connected to the catch 54, here via an intermediate element 118. The intermediate element 118 can be connected to the catch 54 in an articulated manner, for example by means of a peg 102. The coupling rod 114 extends through a recess 120 in the adjusting part 40. The recess 120 makes it possible to make the coupling rod 114 straight and to connect the catch 54 and the spring-damper unit 50 to one another in a direct way by means of the straight coupling rod 114.

The compression spring of the spring-damper unit 50 pretensions the catch 54 into the position shown in FIGS. 13*a* and 13*b*. The spring-damper unit 50 is accordingly in a relaxed position in FIGS. 13*a* and 13*b*. The compression spring presses the carriage 104 away from the adjusting part 40 by means of the piston housing 106. The catch 54 is entrained, via the coupling rod 114, in guide grooves 86 of the body 32 counter to the closing direction 56 toward the adjusting part 40.

Figure 14A:
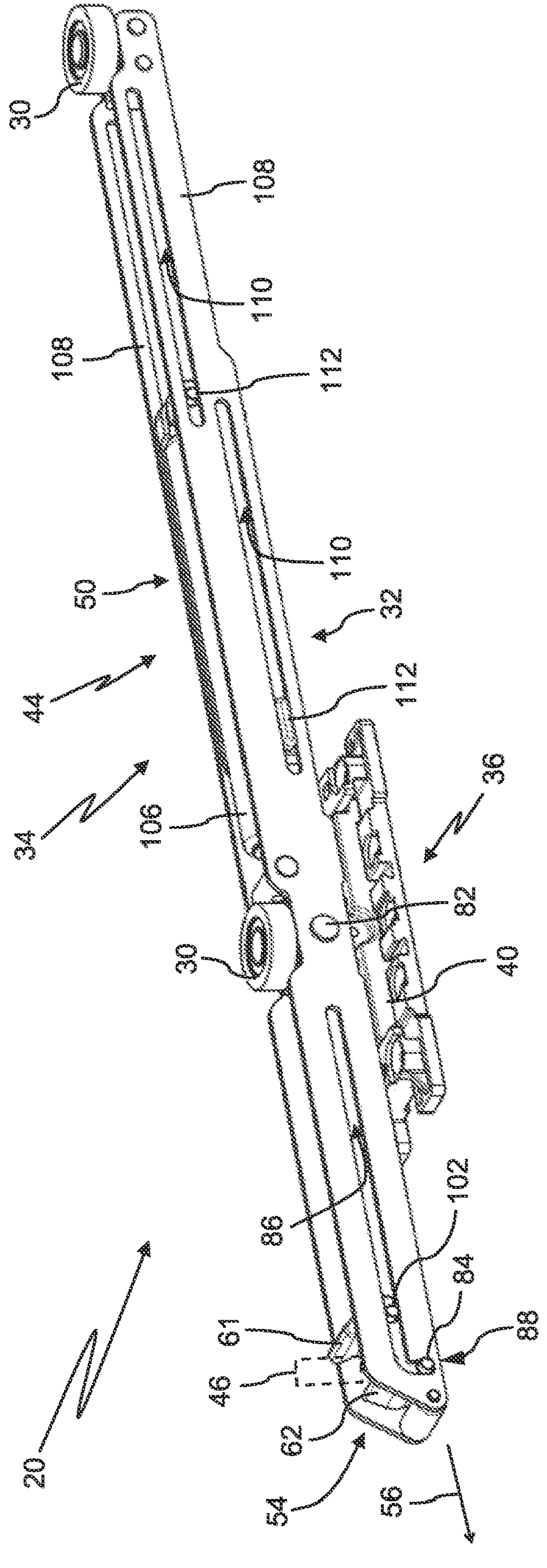
FIG. 14*a* is a schematic perspective view of the fitting arrangement of FIG. 13*a*, the compression spring being in a tensioned position and the catch being latched on the body.
Figure 14B:
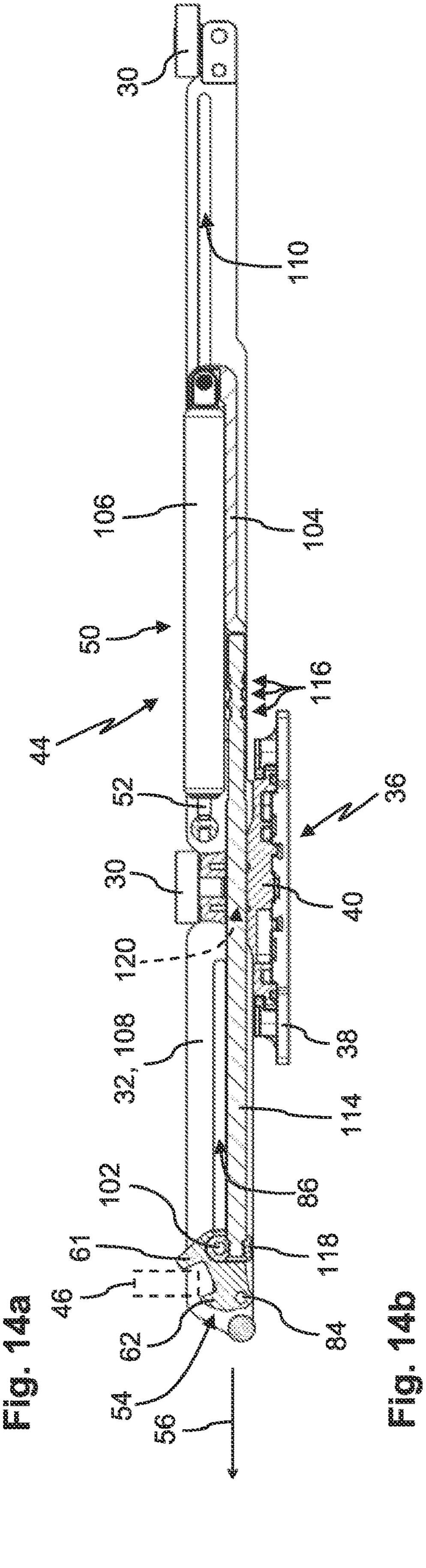
FIG. 14*b* shows the fitting arrangement according to FIG. 14*a* in a schematic longitudinal section.

FIGS. 14*a* and 14*b* show the fitting arrangement 20 of FIG. 13*a* in a perspective and sectional view, respectively, the spring-damper unit 50 being in a tensioned position. The catch 54 is latched in angled portions 88 of the guide grooves 86 in the body 32 by means of pin-like projections 84. As a result, the spring-damper unit 50 is held in the tensioned position shown. In the tensioned position, the piston housing 106 and the carriage 104 are displaced toward the adjusting part 40 in relation to the relaxed position (cf. FIG. 13*a*, 13*b*). In contrast, when the spring-damper unit 50 is in the tensioned position, the catch 54 is displaced away from the opening part 40 in the closing direction 56 in relation to the relaxed position.

Otherwise, the movement unit 34 and the control unit 36 of the fitting arrangement 20 of FIG. 13*a*-14*b* correspond in design and function to the movement unit 34 and the control unit 36, respectively, of the fitting arrangement 20 according to the previously described FIG. 10.

Viewing all of the drawings in combination, the invention relates in particular to a fitting arrangement 20 having a control unit 36 for moving a leaf 14 away from a frame 12 in parallel. A movement unit 34 is provided on the control unit 36. The control unit 36 and the movement unit 34 can be fastened directly to one another. The movement unit 34 facilitates the displacement of the leaf 14 along the frame 12. In particular, the movement unit 34 can support or automatically effect a movement of the leaf 14 into a closed position. In the closed position, the leaf 14 can be placed against the frame 12 or moved away from the frame 12 in parallel.

LIST OF REFERENCE SIGNS

Closure arrangement 10
Frame 12
Leaf 14
Fixed field 16
Door opening 18
Fitting arrangement 20
Upper leaf spar 22
Seal 24
Gap 26

Guide rail 28
Guide rollers 30
Body 32
Immovable part 32*a*
Movable part 32*b*
Movement unit 34
Control unit 36
Mounting part 38
Adjusting part 40
Latching elements 42
Energy storage device 44
Activation element 46
Screws 48
Spring-damper unit 50
Piston rod 52
Catch 54
Closing direction 56
Rear end 58
Groove 60
Long leg 61
Short leg 62
Front end 64
Mechanism 66
Handle 68
Drive rod 70
Further control unit 72
Further adjusting part 74
Further guide roller 76
Further mounting part 78
Tabs 80
Bolt 82
Pin-like projections 84
Guide grooves 86
Angled portion 88
Gate portion 90 in mounting part 38
Gate portion 92 in adjusting part 40
Pin 94
Arrows 96, 98
Elongate holes 100
Peg 102
Carriage 104
Piston housing 106
Side parts 108
Guide slots 110
Extension 112
Coupling rod 114
Tapers 116
Intermediate element 118
Recess 120

What is claimed is:

1. A fitting arrangement for a leaf of a sliding window or a sliding door configured to be moved in a first direction away in parallel from a frame and in a second direction that is perpendicular to the first direction, comprising:

a control unit having a mounting part for fixing on the leaf and an adjusting part which is displaceable relative to the mounting part for moving the leaf in the first direction away in parallel from the frame;

a movement unit fastened to the control unit and having an energy storage device and an activation element for the energy storage device, the movement unit or the adjusting part comprising at least one guide roller configured to move the adjusting part in the second direction along a guide rail;

wherein the energy storage device has a body and a spring-damper unit which is arranged in the body; and wherein the energy storage device has a catch for the activation element which can be latched on the body in a tensioned position of the spring-damper unit.

2. The fitting arrangement according to claim 1, wherein the energy storage device is rigidly connected to the adjusting part.

3. The fitting arrangement according to claim 1, wherein the activation element is rigidly connected to the adjusting part.

4. The fitting arrangement according to claim 1, wherein the body is rigid.

5. The fitting arrangement according to claim 1, wherein the spring-damper unit has a gas spring and/or an oil damper.

6. The fitting arrangement according to claim 1, wherein the spring-damper unit is connected to the catch via a coupling rod.

7. The fitting arrangement according to claim 6, wherein the spring-damper unit is connected to the body at one end, in an articulated manner, and in that the spring-damper unit is connected to a carriage at the other end, which carriage is guided displaceably on the body, and in that the coupling rod engages with the carriage.

8. The fitting arrangement according to claim 6 wherein the coupling rod extends through a recess in the adjusting part.

9. The fitting arrangement according to claim 1, wherein the movement unit has a compression spring.

10. The fitting arrangement according to claim 1, wherein the movement unit has a tension spring.

11. A closure arrangement, being a sliding window or a sliding door, for a building opening, comprising:

a frame;

a control unit having a mounting part fixed to the leaf and an adjusting part which is displaceable relative to the mounting part in a first direction;

a leaf which, in a closed position, can, by means of the control unit, be brought closer to the frame and moved away from the frame in parallel in the first direction;

wherein said leaf is displaceable in a second direction along a guide rail of the frame, the second direction being perpendicular to the first direction;

a movement unit fastened to the control unit and having an energy storage device and an activation element for the energy storage device for supporting a movement of the leaf along the guide rail and/or for braking a movement of the leaf along the guide rail;

wherein the energy storage device has a body and a spring-damper unit which is arranged in the body; and wherein the energy storage device has a catch for the activation element which can be latched on the body in a tensioned position of the spring-damper unit.

12. The closure arrangement according to claim 11, wherein the movement unit assists in bringing the leaf into the closed position.

13. The closure arrangement according to claim 11, wherein the movement unit assists in removing the leaf from the closed position.

14. The closure arrangement according to claim 11, wherein the activation element of the movement unit is arranged laterally next to the energy storage device of the movement unit.

15. The closure arrangement according to claim 11, wherein the activation element of the movement unit is arranged above the energy storage device of the movement unit.

16. The closure arrangement according to claim 11, wherein the leaf has a mechanism for controlling a movement of the adjusting part of the control unit with respect to the mounting part.

17. The closure arrangement according to claim 11, wherein the movement unit is configured for moving the leaf automatically.

18. A fitting arrangement for a leaf of a sliding window or a sliding door, wherein the leaf is configured to be moved by the fitting arrangement in a first direction away in parallel from a frame and in a second direction that is perpendicular to the first direction, the fitting arrangement comprising:

a control unit having a mounting part for fixing on the leaf and an adjusting part which is displaceable relative to the mounting part for moving the leaf in the first direction away in parallel from the frame;

a movement unit fastened to the control unit and having an energy storage device and an activation element for the energy storage device, the movement unit or the adjusting part comprising at least one guide roller configured to move the adjusting part in the second direction along a guide rail;

wherein the energy storage device has a body and a spring-damper unit which is arranged in the body; and wherein the energy storage device has a catch for the activation element which can be latched on the body in a tensioned position of the spring-damper unit;

wherein either:

i) the energy storage device is rigidly connected to the adjusting part; or ii) wherein the spring-damper unit is connected to the catch via a coupling rod; and wherein the spring-damper unit is connected to the body at one end, in an articulated manner, and in that the spring-damper unit is connected to a carriage at the other end, which carriage is guided displaceably on the body, and in that the coupling rod engages with the carriage.

19. The fitting arrangement according to claim 18, wherein the coupling rod extends through a recess in the adjusting part.

* * * * *